Patented Mar. 28, 1939

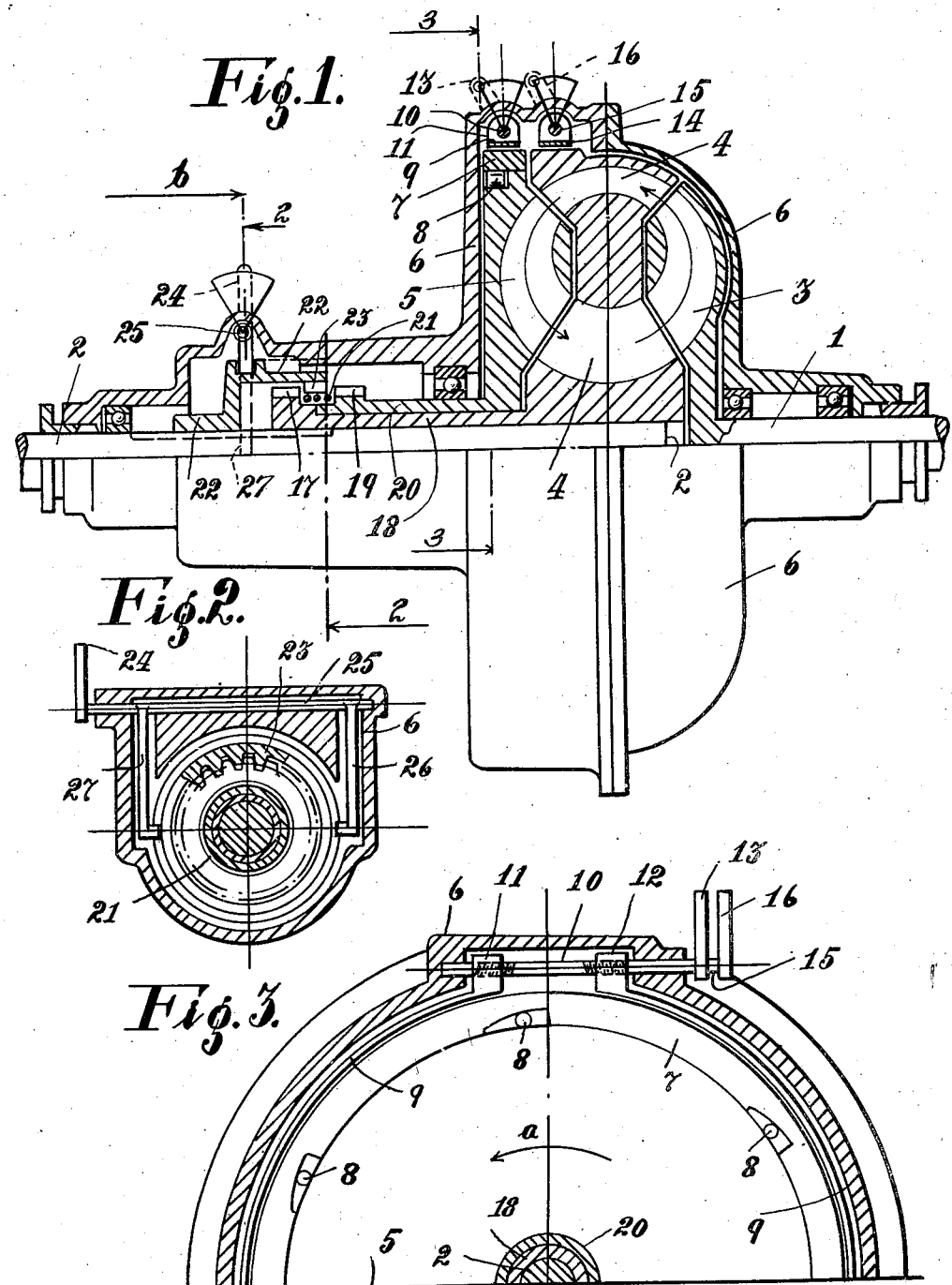

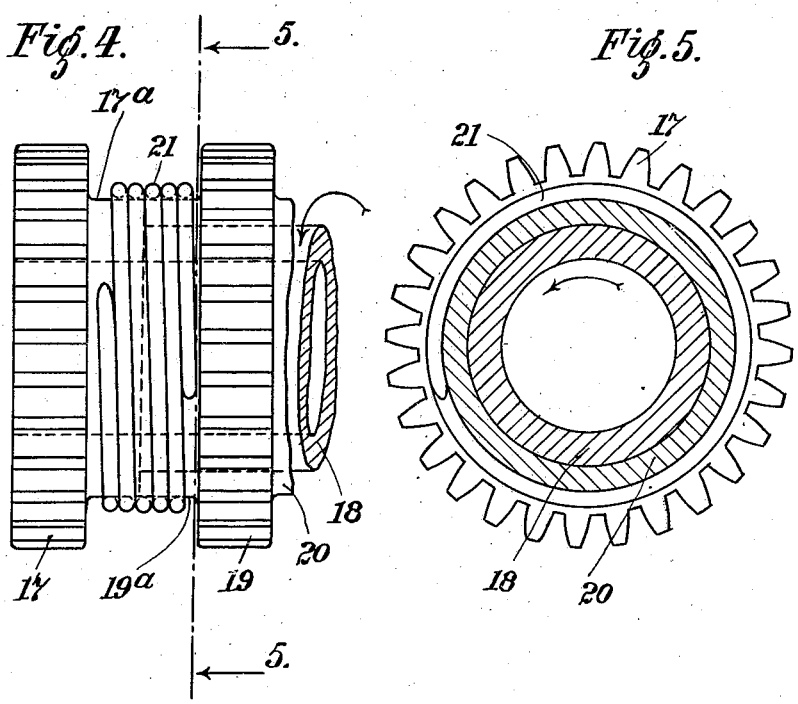

2,152,113

UNITED STATES PATENT OFFICE 2,152,113

HYDRAULIC POWER TRANSMISSION

Willem Petrus van Lammeren, Voorschoten, Netherlands

Application October 23, 1936, Serial No. 107,245
In Great Britain November 27, 1935

6 Claims. (Cl. 60—54)

This inventtion relates to hydraulic power transmissions of the Föttinger type, and the object of the invention is to provide improvements in the reversal of direction of such transmissions.

Such hydraulic transmission-gears have a driving vaned pump impeller, a driven vaned member and a non-rotating guide vaned member. The driven vaned member is adapted to receive the active pressure of the flow of the liquid from the impeller and to rotate in the forward direction. On the non-rotating guide vaned member acts the reactive pressure which is opposite to the active pressure. In consequence of this if, as in the present invention, the non-rotating guide vaned member is allowed to rotate and the "driven" vaned member is converted or changed to a non-rotating one, the "guide" vaned member will be set in rotation, opposite to the original forward direction of the apparatus. If at the same time the "guide" vaned member is coupled to the driven shaft and the original rotating vaned member is disconnected from this shaft, the apparatus is adapted to transmit the energy of the flow of liquid in a direction reversed to the original one. This is the principle of the present invention according to which an hydraulic power transmission of the Föttinger type is characterised by the fact that the direction of the transmission of the energy can be reversed without reversal of the direction of the stream of liquid itself, the "driven" vaned member and the "guide" vaned member exchanging functions on reversal so that the driven shaft is driven by said "guide" vaned member.

The invention will now be described by way of example with reference to the annexed drawings in which:

Fig. 1 shows an elevation, half in section, of a reversible hydraulic power transmission according to the invention.

Fig. 2 is a section on the line 2—2 of Fig. 1.

Fig. 3 is a section on the line 3—3 of Fig. 1.

Fig. 4 is an enlarged detail view and Fig. 5 is a cross sectional view on the line 5—5 of Fig. 4.

The driving shaft is indicated by 1, the driven shaft by 2. The driving vaned member 3, the driven vaned member 4, and the guide vaned member 5 form together a hollow ring in which the liquid transmitting the energy from the driving shaft 1 to the driven-shaft 2, circulates. The shafts 1 and 2 with the vaned members 3, 4 and 5 are rotatively disposed in the casing 6. A ring 7 is rotatably mounted concentrically with the guide vaned member 5 on a circumferential part of the guide vaned member and is provided with the freewheel devices 8 between it and the guide vaned member.

A brake-band 9 encircles the ring 7 and is operated by the threaded spindle 10 in the following manner. The spindle 10 has a left-hand threaded part and a right-hand threaded part, which parts engage respectively the left-hand and right-hand threaded screw nut-shaped ends 11 and 12 of the brake-band 9. By turning the spindle 10 by the crank 13 the ends 11 and 12 will approach one another or recede and in consequence the ring 7 will be respectively braked or loosened.

If the ring 7 is braked by the band-brake 9, the freewheels 8 prevent the rotation of the guide vaned member 5 in the direction of the arrow $a$ (Fig. 3) but allow its rotation in the opposite direction for the purpose mentioned below.

A similar band-brake arrangement is provided for the vaned member 4 but without the concentric ring 7 with the free-wheel devices or equivalents 8. A brake band 14, operated in similar fashion by the threaded spindle 15 and the crank 16 can brake the vaned member 4 against rotation in clockwise or anti-clockwise direction or can leave it free to rotate in either of these directions of rotation.

A toothed wheel 17 is provided on the end of the hollow shaft 18 integral with the vaned member 4, whilst a congruent toothed wheel 19 is provided on the end of the hollow shaft 20 integral with the guide vaned member 5. The adjacent parts of the bosses of the toothed wheels 17 and 19 are of equal diameter. A spring 21 constituting a one-way driving connection is provided on these adjacent parts of the bosses. The direction of the coils of the spring which acts in well known manner as a coil clutch is such that the toothed wheel 19 (and in consequence the shaft 20 with the vaned member 5) is prevented from rotation in the direction opposite to that indicated by the arrow $a$ (Fig. 3) at a speed greater than the vaned member 4, that is, the spring serves to prevent the guide vaned member 5 from over-running the vaned member 4 during forward driving. The spring is shown to a larger scale in Fig. 4, being coiled round the sleeve extensions 17$^a$, 19$^a$ of the wheels 17 and 19 and is anchored or pinned at one end to the sleeve 17A. If the sleeve 20 tends to rotate at a greater speed than the shaft 18 in the direction indicated by the arrow in Fig. 5 (i. e., opposite to the direction of arrow $a$, (Fig. 3), the effect is to tighten the coils of the spring so that it grips the extension 19$^a$ and extension 17$^a$ and prevents the sleeve 20 over-running the shaft 18.

An annular member 22 which is slidably keyed on the shaft 2 has an internally toothed gear wheel 23 which is adapted to engage the toothed wheel 17 or 19 and forms a dog clutch, if the shiftable annular member 22 has been axially adjusted to the required position. The axial adjustment of the sleeve 22 is obtained by adjusting the crank 24 on the shaft 25 which has the levers 26 and 27.

If the internal gear 23 engages the toothed wheel 17, the rotation of the vaned member 4 is transmitted to the shaft 2.

If the internal gear 23 engages the toothed wheel 19, the rotation of the guide vaned member 5 is transmitted to the shaft 2.

The working of the apparatus is as follows:

For clockwise direction of rotation, looking in the direction of arrow $b$, Fig. 1: The vaned member 4 is permitted to rotate by release of the brake 14; and the guide vaned member 5 is braked by adjusting the cranks 16 and 13, whilst the shaft 2 is connected to the vaned member 4 by adjusting the crank 24 in such manner that the internal gear wheel 23 engages the toothed wheel 17. The simultaneous adjustment of the cranks 16, 13 and 24 may be executed in any suitable manner.

Now the driving shaft 1 with the vaned member 3 is set in clockwise rotation (looking in the direction of arrow $b$, Fig. 1. The circulating liquid sets the vaned member 4 also in clockwise rotation and as the vaned member 4 is coupled by the shiftable annular member 22 to the shaft 2, this shaft will also rotate in clockwise direction. The guide vaned member 5 which is braked, serves as a reaction member to increase the torque on the driven shaft. On increase in the speed of rotation of the vaned member 4, the reaction pressure on the guide vaned member 5 decreases to zero and in order to prevent a braking of the vaned member 4 by the guide vaned member 5, the freewheels 8 allow the guide vaned member 5 to co-rotate with the vaned member 4 in clockwise direction, the spring 21 as above described, preventing the guide vaned member 5 from over-running the vaned member 4. The apparatus thus acts as a torque converter at first, but when the speed of the vaned member 4 approaches that of the driving vaned member 3 and the guide vaned member 5 commences to rotate, the apparatus works as a hydraulic coupling, the guide vaned member 5 being inoperative as such. No claim is made to this feature per se.

For anti-clockwise rotation, looking in the direction of the arrow $b$, Fig. 1.

The guide vaned member 5 is permitted to rotate in a counter-clockwise direction by release of the brake 9, and the vaned member 4 is braked by adjusting the respective cranks 13 and 16, whilst the shaft 2 is coupled to the guide vaned member 5 by adjusting the crank 24 in such manner that the internal gear wheel 23 engages the toothed wheel 19.

Now the driving shaft 1 with the vaned member 3 is set in clockwise rotation. The vaned member 4 being braked, the fluid stream is repulsed in it in anti-clockwise direction and sets the guide vaned member 5 in anti-clockwise rotation and as the guide vaned member 5 is coupled by the sleeve 22 to the shaft 2, this shaft will also rotate in anti-clockwise direction. The vaned member 4 which is braked serves as a reaction wheel, that is the reversals in the direction of the driven shaft 2 are obtained by causing the vaned and guide vaned members 4 and 5 to exchange functions.

It will be understood that the above described construction for braking the vaned members and coupling the vaned members to the shaft may be altered without departing from the scope of the invention.

I claim:

1. A reversible hydraulic power transmission of the Föttinger type, comprising a driving and a driven shaft, a vaned pump impeller on the driving shaft, a first rotatable vaned member adjacent the pump impeller and a second rotatable vaned member adjacent the first rotatable vaned member, said vaned members co-operating to form a fluid power transmitting circuit, releasable braking means for preventing rotation of said first vaned member, a releasable one-way braking device for preventing rotation of the second vaned member in the direction reverse to that of the first vaned member but allowing it to rotate in the same direction as the first vaned member so that the transmission can act as an hydraulic coupling, coupling means for selectively coupling either of said rotatable vaned members to the driven shaft and means for preventing said second vaned member rotating faster than the first vaned member in the forward direction, the arrangement being that said first vaned member acts as the forward driving member when its braking means is released and it is coupled to the driven shaft and said second vaned member acts as the reverse driving member when its one-way braking means is released and it is coupled to the driven shaft, the first member being braked and acting as a guide vaned member.

2. An hydraulic power transmission of the Föttinger type, comprising a driving and a driven shaft, a vaned pump impeller on the driving shaft, a first rotatable vaned member adjacent the driving vaned member and a second rotatable vaned member adjacent the first rotatable vaned member, said vaned members co-operating to form a fluid power transmitting circuit, releasable brake means for preventing rotation of said first vaned member, a one-way brake device for preventing rotation of the second vaned member in the direction reverse to that of the first rotatable vaned member, coupling means for selectively coupling either of said rotatable vaned members to the driven element and a one-way coupling between said first and second rotatable vaned members to prevent the latter rotating quicker than the first in the same direction, the arrangement being that said first rotatable vaned member acts as the forward driving member when its brake means is released and it is coupled to the driven shaft and said second rotatable vaned member acts as the reverse driving member when its one-way brake device is released and it is coupled to the driven shaft, the first rotatable vaned member being braked and acting as a guide member.

3. An hydraulic power transmission of the Föttinger type, comprising a driving and a driven shaft, a vaned pump impeller member, a first rotatable vaned member adjacent the pump impeller and a second rotatable vaned member adjacent the first rotatable vaned member, said vaned members co-operating to form a fluid power transmitting circuit, a brake for said first rotatable vaned member, means for operating said brake, a rotatable element on said second member, a one-way coupling between said rotatable element and the vaned member, a brake for said element and means for operating said brake, coupling means for selectively coupling either of said rotatable vaned members to the driven element and means for preventing said secondmentioned vaned member rotating faster than the firstmentioned vaned member in the same direction, the arrangement being that said first vaned member acts as the forward driving member when its brake is released and it is coupled to the driven shaft and said second vaned member acts as the reverse driving member when the brake for the rotatable element is released and the second vaned member is coupled to the driven shaft, the first vaned member being braked and acting as a guide member.

4. An hydraulic power transmission of the Föttinger type comprising a driving and a driven shaft, a vaned impeller member on the former, a rotatable vaned member adjacent the impeller and a second rotatable vaned member adjacent the first rotatable vaned member, said vaned members co-operating to form a fluid power transmitting circuit, a brake for said first vaned member, means for operating said brake, a rotatable element on said second vaned member, a one-way coupling between said rotatable element and the vaned member, a brake for said rotatable element, means for operating said brake, a sleeve on said first vaned member rotatably mounted on the driven shaft, a sleeve on the second vaned member rotatably mounted on the firstmentioned sleeve, a clutch element on each sleeve and a movable co-operating clutch element on the driven shaft movable into engagement selectively with either of said firstmentioned clutch elements, and means between said clutch elements to prevent the second vaned member rotating faster in the forward direction than the firstmentioned vaned member, the arrangement being that said first vaned member acts as the forward driving member when its brake is released and it is coupled to the driven shaft and said second vaned member acts as the reverse driving member when the brake for the rotatable element is released and the second vaned member is coupled to the driven shaft, the first vaned member being braked and acting as a guide member.

5. A reversible hydraulic power transmission of the Föttinger type embodying a driving shaft, a driving vaned member thereon, a driven shaft, two rotatable vaned members, means for selectively preventing the rotation of any one of said two rotatable vaned members, a coupling between the free vaned member and the said driven shaft, means for preventing rotation of one of the rotatable vaned members in directions opposite to the direction of rotation of the other rotatable vaned member, and a one-way clutch operable to control the relative speed of rotation of the said rotatable vaned members in the same direction.

6. A reversible hydraulic power transmission of the Föttinger type embodying a driving shaft, a driving vaned member thereon, a driven shaft, two rotatable vaned members, means for selectively preventing the rotation of any one of said two rotatable vaned members, a coupling between the free vaned member and the said driven shaft, means for preventing rotation of one of the rotatable vaned members in directions opposite to the direction of rotation of the other rotatable vaned member, and a one-way clutch operable to control the relative speed of rotation of the said rotatable vaned members in the same direction, the said clutch being disposed between the two said rotatable vaned members.

WILLEM PETRUS van LAMMEREN.